United States Patent [19]

Cummins

[11] 3,982,837

[45] Sept. 28, 1976

[54] METHOD AND APPARATUS FOR CALIBRATING RESEAU GRIDS

[75] Inventor: James B. Cummins, Silver Spring, Md.

[73] Assignee: Controlled Environment Systems, Inc., Rockville, Md.

[22] Filed: Jan. 24, 1975

[21] Appl. No.: 543,957

[52] U.S. Cl. .............................. 356/168; 33/125 C; 73/1 R; 356/169; 356/172
[51] Int. Cl.² ................................................ G01B 11/14
[58] Field of Search .......... 356/164, 165, 166, 168, 356/169, 170, 171, 172; 33/1 L, 125 C; 73/1 R

[56] References Cited
UNITED STATES PATENTS

| | | | |
|---|---|---|---|
| 3,551,055 | 12/1970 | Chitayat | 356/170 |
| 3,560,093 | 2/1971 | Montone | 356/165 |
| 3,621,582 | 11/1971 | Radencic | 33/184.5 |
| 3,632,215 | 1/1972 | Holtz | 356/172 |

*Primary Examiner*—John K. Corbin
*Assistant Examiner*—Richard A. Rosenberger
*Attorney, Agent, or Firm*—Larson, Taylor and Hinds

[57] ABSTRACT

Apparatus and method for calibrating the points in a large Reseau grid with extreme accuracy. The method includes superimposing a smaller calibrated master grid on the large grid, comparing the location of the point on the large grid with the location of the corresponding point on the master grid, generating the comparison data, translating the master grid to another location, comparing the points on the two grids, and repeating the translating and comparing steps until the entire large grid is calibrated. A laser interferometer is used to determine the amount of translation of the master grid with the requisite accuracy.

10 Claims, 3 Drawing Figures

METHOD AND APPARATUS FOR CALIBRATING RESEAU GRIDS

BACKGROUND OF THE INVENTION

1. Field of the Invention

This invention relates to a method and apparatus for calibrating relatively large grids, such as reseau grids and more particularly relates to a method for calibrating large grids using a calibrated grid in a comparison test.

2. Description of the Prior Art

The use of grids, such as a reseau grid, for referencing measurements on large format photography is a well known and widely practiced technique. However, the difficulty in accurately and reliably calibrating large grids on the order of 9 inches by 126 inches has been a basic problem. Calibration of grids, such as reseau grids, involves more than nominally measuring the arbitrary (X,Y) location of a set of randomly located intersections. Rather, the measuring task is the determination of the small distances, often on the order of a few microns, the actual intersections or points are from the desired perfect pattern location.

Presently employed grid calibrations for standard size grids are usually made with a comparator using, for example, a four-rotation measurement technique to reduce systematic measurement errors. However, even where some of the larger comparators can be used with a grid pattern having dimensions as large as 10 inches by 36 inches, the four-rotation measurement technique cannot be used since the grid can only be rotated for direct and reverse readings. The calibration of even larger grid patterns by using comparators is not possible. Other calibration techniques employ the measurement of absolute distances of the intersection points in the X and Y directions and comparing the absolute measurements with the desired distances. However, as grid size increases to several feet in one dimension, all known and presently employed grid calibration methods are unable to provide acceptable accuracy without elaborate equipment in carefully controlled laboratory conditions.

SUMMARY OF THE INVENTION

The ideal method for the measurement and calibration of a large grid, such as a reseau grid, is to superimpose on the large grid a "perfect" grid having a grid pattern matching the pattern of the grid to be calibrated. Then, one need only to observe the differences in the locations of the points on the grid to be calibrated and the "perfect" grid and to note the location errors. Naturally, a perfect grid is not available and even if one were available, it would not be possible to verify the perfection of the grid.

The present invention provides a method and apparatus for accurately and reproducably calibrating large grids in a relatively inexpensive and fast manner. In the method according to the present invention, a smaller, calibrated master grid having a mirror image pattern of the grid to be calibrated is successively, directly overlaid on the large grid. The locations of the actual points on the large grid with respect to the master grid overlay are compared in each overlay and then the master grid is accurately translated to a new position. A laser interferometer determines the translated distance and the rotational alignment of the master grid.

These and other objectives and advantages of the invention are described in or are obvious from the detailed description of the presently preferred embodiments described hereinbelow.

DETAILED DESCRIPTION OF THE PREFERRED EMBODIMENTS

Figure 1:
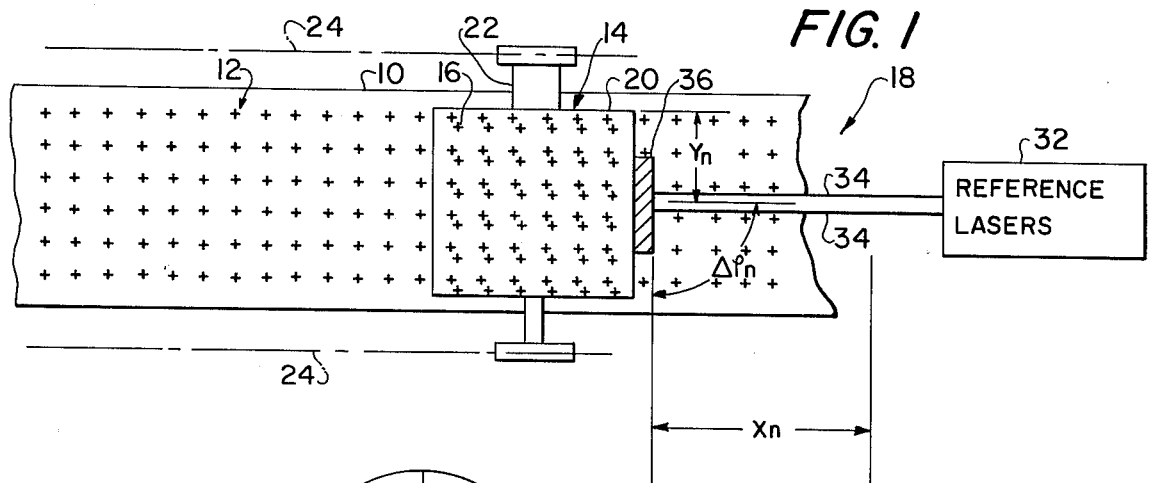
FIG. 1 is a schematic representation of apparatus in accordance with the invention used to calibrate a reseau grid.
Figure 1A:
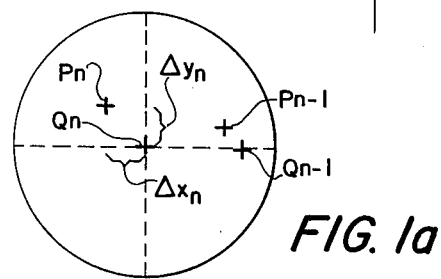
FIG. 1a is an enlarged portion of part of FIG. 1.

The present invention is best understood upon consideration of the drawings in which like numerals denote like elements in the several views. Referring to FIGS. 1 and 1a, a large reseau grid 10 is depicted having a plurality of points 12 arranged in a standard pattern. Ideally, all the points 12 would be perfectly located within the pattern. However, due to unavoidable errors in making grid 10, points 12 are all displaced an unknown amount from their respective ideal locations. Even though the location error is very small, usually on the order of a few microns, it is very important that the actual amount of error be known so that proper corrections can be made when the grid is used.

Apparatus according to the present invention comprises a movable calibrated grid 14 having a plurality of points 16 arranged in the same grid pattern as grid 10 and a means, such as an interferometer system 18, for measuring with extreme accuracy the exact amount of movement of calibrated grid 10.

Calibrated grid 14 is comprised of a planar base 20 onto which points 16 are imprinted. Base 20 in one embodiment is comprised of a planar glass substrate that is transparent to visable light radiation and points 16 are indicated by non-transparent markings. Alternatively, base 20 can be comprised of a transparent planar support substrate onto which a partially transparent metallic coating has been deposited with points 16 being indicated by clear areas on the base. The alternative base can be used, for example, with automatic data measurement systems whereby the clear line of intersections of the calibrated grid and grid 10 can be rapidly scanned automatically and an electronic computer can be used to calibrate grid 10.

The points on both grid 10 and calibrated grid 14 are indicated in the figures by the conventional short line intersection. The grid pattern using this marking technique is usually generated by a printing or coating process controlled by an electronic computer and therefore can be readily and inexpensively generated. However, alternate grid point designs may be preferred for use on calibrated grid 14. One such design is the conventional box pattern which employs a rectangular or square box having all four sides calibrated. The box has a size such that the unknown location of a point 12 being calibrated will always be within the box. The calibration measurement is then the ratio of the location of point 12 from the box sides. Because a ratio measurement is made when calibrating a box grid point design, the design provides the advantage that linearity is the only requirement placed on the measuring device.

Calibrated grid 14 is rigidly and accurately secured to a movable trolley 22 which in turn is mounted for longitudinal, translational movement on a pair of nominal ways 24. Nominal ways 24 can include for example conventional rails. The apparatus for accurately providing translational movement in only a longitudinal direction is well known in the art and therefore need not be described in any further detail.

The precise location of the translating calibrated grid 14 can be determined by any known means. The presently preferred means, however, is a laser interferometer system, generally indicated at 18. Measuring distances by non-laser interferometers is old and quite well known. With the invention of the laser and the adaptation of the laser to interferometers, however, the extreme accuracy requisite for a grid calibration has become obtainable. Laser interferometer systems usable with the present invention are well known and one such system is disclosed in the U.S. Pat. to Chitayat, No. 3,551,055. The principal requirements for any interferometer system usable in the present invention is that it be capable of measuring translation in all three planes and rotation about all three axes with an accuracy of at least a half-micron (i.e., $5 \times 10^{-7}$ meters).

The necessity for measuring translations in more than one plane becomes apparent when it is realized that it is impossible to build a system to translate a grid a longitudinal distance of over 10 feet without any lateral or vertical displacement whatsoever of the grid occurring. It is likewise impossible to build a system where there will be absolutely no rotation of the calibrated grid or of its movable mounting means with that amount of translation. However, with the assistance of a programmed digital computer, an extremely accurate calibration of a large grid can be made by adjusting the raw comparison data for the amount of translational and rotational movement of the calibrated grid.

A typical laser interferometer system such as laser interferometer system 18 shown in the drawings, comprises a plurality of reference lasers 32 which emit reference beams 34, a beam returning means such as planar mirror 36, and a system (not shown) for comparing emitted reference beams 32 with the returned beam, for determining the amount of translation and rotation, and for outputting the determined information.

A conventional comparison of calibrated grid 14 with large grid 10 normally can be accomplished by directly reading the differential distances (as opposed to the absolute distances) in the horizontal, or "X" direction and the vertical, or "Y" direction between the point on calibrated grid 14 and the point being calibrated on large grid 10. A conventional comparator (not shown) having a measuring size and a microscope is used to measure the distances for each point on large grid 10. Because only differential distances are being measured and the maximum total distance in either the X or Y direction is usually under 100 microns, a measuring accuracy of using the direct microscope reading method can easily be obtained.

Alternatively, the comparison of a calibrated grid with another grid can be made by using a piece of unexposed film 38 (FIG. 2) between large grid 10 being calibrated and calibrated grid 14 and at each translating calibrated grid 14 location making a brief double exposure with a light means 40 located above calibrated grid 14 and a light means 42 located below large grid 14. After the comparison is made along the entire length of large grid 10, film 38 is developed and the 'X'-'Y' distances read using the aforementioned conventional comparator. Film 38 can be comprised of a plurality of separate pieces, each piece being used for each translated position of calibrated grid 14 or can be comprised of a single large piece of film extending over the entire large grid 10. Obviously, if a single piece of film is used, means would have to be employed to prevent prematurely exposing portions of the film outside the section of large grid 10 being compared.

The advantages of using the double exposure method of comparison include a minimum set-up time, the raw data (i.e., the actual measured distances between the calibrated grid point 16 and the point 12 being calibrated) is permanently recorded for future use and reuse, and the reduction of the time in obtaining the raw data since there is no need to stop at each translated position for the length of time required to read all the data points. In addition, the accuracy of the measurements would not be reduced significantly, if at all, as a result of film stability, and can in some cases be increased since any chance of drift or loss of measurement reference during a calibration run is reduced with a reduction in the calibration time.

Calibrated grid 14 can be fabricated and calibrated by conventional techniques since it can have a size (for example, a grid pattern of 9 inches by 9 inches) that can be covered by a conventional comparator. In addition, as a result of the small size of calibrated grid 14, four-rotation measurements are possible and independent calibrations can be statistically merged. Finally, a calibrated grid of this size can be easily transported and handled for measurement with little fear of sustaining a measurement bias from the handling.

Referring to FIG. 1, the method of calibrating large grid 10 is performed by first superimposing calibrated grid 14 over a first end of grid 10. It is preferable to offset the superimposed calibrated grid pattern by a nominal amount in each axis, for example, 50 microns, from the large grid pattern to ensure that all measurements fall in the same quadrant. The final calibration of points 12 on large grid 10 would then be compensated for the offset. The comparison of the location points 12 with points 16 is then made by the direct measurement step or the double-exposure photographic step described above.

Figure 2:
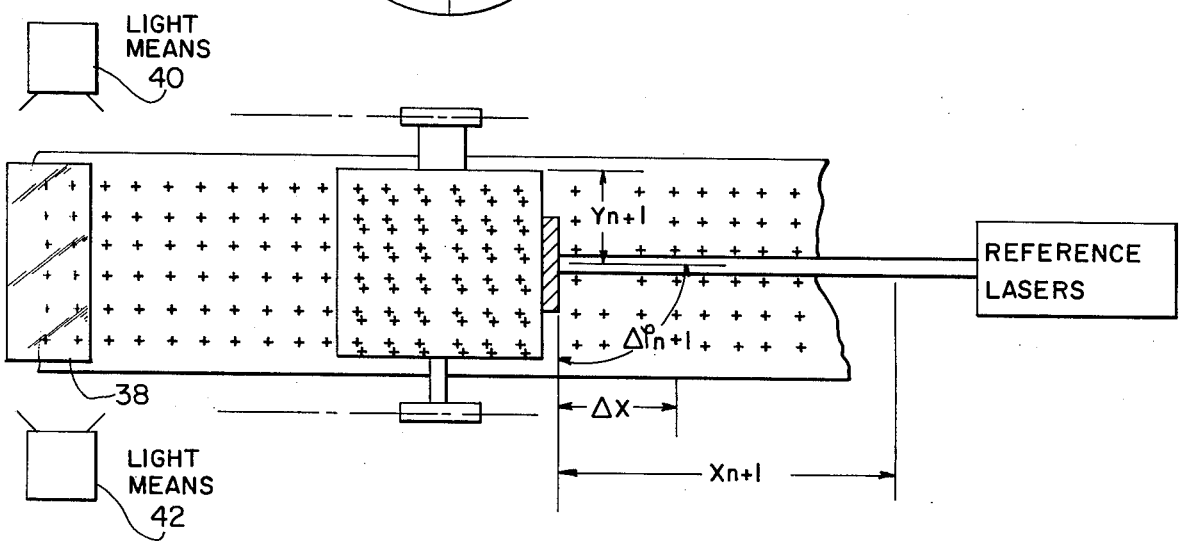
FIG. 2 is a schematic representation of the apparatus shown in FIG. 1, but translated a longitudinal distance therefrom.

After all the points 12 of large grid 10 in the first superimposed position of calibrated grid 14 are compared, calibrated grid 14 is translated a known longitudinal amount along ways 24 to a second superimposed position, as shown in FIG. 2. The interferometer then measures the exact amount of longitudinal translation as well as the exact amounts of erroneous translations in the other two planes and in the three degrees of rotation. The comparison of calibrated points 16 with points 12 is repeated and the entire process repeated until the entire grid pattern of large grid 10 has been compared. If desired, each translation step can have one or more pattern groups overlapping with adjacent steps in order to obtain redundant data which can also be used to correlate the data from the adjacent steps.

The data which is generated by analysing the comparison of grid points (refer to FIG. 1a) includes the identification of the particular grid point 12 under calibration ($Pi$) the identification of the corresponding calibrated grid point 16 ($Qi$) and the translation parameters of the points, $\Delta xi$ and $\Delta yi$. In addition, the longitudinal translation of calibrated grid 14 ($X_i$) and the translational and rotational displacement errors (exemplified by $Y_i$ and $P_i$) are generated for each translation of calibrated grid 14. Finally, the point offset, if any, and the calibration offsets for the points 16 in calibrated grid 14 must be considered in order to convert the raw data for each point to the calibration data for that point.

It is noted that although the present invention does not require the use of an electronic computer, the most practical employment of the present invention incorporates data processing equipment and an electronic computer.

The present invention has been described in detail with respect to exemplary embodiments thereof. However, it will be understood by those of ordinary skill in the art that variations and modifications of the invention may be effected within the scope and spirit of the invention as set forth herein.

I claim:

1. A method for calibrating elongate large grids having a plurality of points in a repeating grid pattern wherein the points have errors in their location in the grid pattern, said method comprising the steps of:
    superimposing on the large grid a smaller calibrated grid having the same grid pattern as the large grid wherein the points on the calibrated grid are precisely located, and the actual location of the points is accurately known, and orienting the calibrated grid pattern in the same orientation as the large grid pattern;
    comparing the location of the points on said superimposed calibrated grid with the location of the points on the large grid;
    translating said calibrated grid a known distance and superimposing said grid pattern of said calibrated grid on a different part of the grid pattern of the large grid;
    determining the exact amount of translation and rotation of said translated calibrated grid;
    comparing the location of said points on the superimposed calibrated grid in the translated position with the location of the points on the large grid for obtaining error displacement differentials of the points on the large grid; and
    repeating the translating, determining and comparing steps until all of the points on the large grid have been calibrated.

2. A method for calibrating large grids as claimed in claim 1 wherein each said determining step is performed with a laser interferometer arrangement and said calibrated grid is translated solely along the longitudinal axis of the large grid.

3. A method for calibrating grids as claimed in claim 2 wherein said superimposing step further comprises offsetting in one of the quadrants of a Cartesian coordinate system said calibrated grid pattern a predetermined known amount from the large grid pattern thereby insuring that all errors are located in the same quadrant, and said comparing step further comprises adjusting the comparison for the predetermined offset amount.

4. A method for calibrating large grids as claimed in claim 2 wherein each said comparing step comprises measuring directly the distances in each Cartesian coordinate in a preoriented Cartesian coordinate system between each point in said calibrated grid and the corresponding point in the large grid.

5. A method for calibrating large grids as claimed in claim 4 wherein each said determining step further comprises determining the exact amount of erroneous transverse translation of said calibrated grid and said method further comprises adjusting said measurements for the determined amount of rotation and transverse translation of said calibrated grid.

6. A method for calibrating large grids as claimed in claim 2 further comprising placing unexposed film in alignment with the large grid and said calibrated grid before the first calibrating step is performed and each said comparing step further comprises exposing the portion of film located in alignment with said calibrating grid, said method further comprising developing said film and measuring directly the distances in each Cartesian coordinate in a preoriented Cartesian coordinate system between each point in said calibrated grid and the corresponding point in the large grid.

7. A method for calibrating large grids as claimed in claim 6 wherein each said determining step further comprises determining the exact amount of erroneous translation of said calibrated grid in the transverse direction and said method further comprises adjusting said measurements for the determined amount of rotation and transverse translation of said calibrated grid.

8. A method for calibrating large grids as claimed in claim 2 wherein said translating step comprises overlapping said translated calibrated grid pattern with part of the previously calibrated large grid pattern thereby obtaining redundant data about the location of the points on the large grid.

9. Apparatus for calibrating elongated large grids having a plurality of points in a repeating grid pattern wherein the points have errors in their location in the grid pattern, said apparatus comprising:
    a calibrated grid having the same grid pattern as the large grid and a length that is shorter than the large grid, and wherein the points on the calibrated grid are precisely located and the actual location of the points is accurately known;
    means for translatably supporting said calibrated grid in a superimposed, closely spaced relationship with the large grid;
    elongate guide means for accurately guiding the calibrated grid support means in a longitudinal direction along the large grid;
    an interferometer system for accurately determining the amount of translation and rotation of said calibrated grid; and
    means for comparing the location of said points on the superimposed calibrated grid with the location of the points on the large grid for obtaining error displacement differentials of the points on the large grid.

10. Apparatus for calibrating elongate large grids as claimed in claim 9 wherein said comparing means includes photographic film located in alignment with the large grid and means for exposing only that portion of said film also in alignment with said calibrated grid; and wherein at least one of said large grid and said calibrated grid is comprised of a photographically transparent base on which said grid pattern is located.

* * * * *